United States Patent

[11] 3,613,762

| | | |
|---|---|---|
| [72] | Inventor | Theodore J. Reinhart, Jr.<br>345 Forrer Blvd., Dayton, Ohio 45419 |
| [21] | Appl. No. | 880,002 |
| [22] | Filed | Nov. 26, 1969 |
| [45] | Patented | Oct. 19, 1971 |

[54] FABRIC INSERTS FOR FILAMENT WOUND AIRCRAFT TIRES
1 Claim, 2 Drawing Figs.

[52] U.S. Cl.................................................. 152/354, 152/352
[51] Int. Cl.................................................. B60c 9/06, B60c 15/06
[50] Field of Search........................................ 152/354, 355, 362, 362 CS

[56] References Cited
UNITED STATES PATENTS
| | | | |
|---|---|---|---|
| 3,044,523 | 7/1962 | Drakeford et al............. | 152/362 |
| 3,171,462 | 3/1965 | Reinhart, Jr.................. | 152/355 |
| 3,386,486 | 6/1968 | Kovac et al.................. | 152/354 |

Primary Examiner—Arthur L. La Point
Assistant Examiner—Robert Saifer
Attorneys—Harry A. Herbert, Jr. and Charles W. Wagner ABSTRACT: A filament wound aircraft tire of the toroidal type which includes annular fabric strips positioned between the circular piles of the carcass in the heel or rim area, reinforcing the heel and adjacent rim edge increasing the strength and modulus of the tire carcass in this flexure area, and preventing flexure and compression fatigue failures of the carcass piles in these highly stressed areas.

This invention constitutes an important improvement on my invention disclosed in my (T. J. Reinhart, Jr.) U.S. Pat. No. 3,171,462 for Toroidal Pneumatic Tire, dated Mar. 2, 1965, and having for an object the provision of means to increase the strength and modulus of the toroidal tire carcass in the area of the reinforcing ring or heel bead, adjacent the outer edges of the split rim or wheel.

PATENTED OCT 19 1971

3,613,762

INVENTOR.
THEODORE J. REINHART, JR.
BY Harry A. Herbert Jr.
and
Charles H. Wagner
ATTORNEYS

FABRIC INSERTS FOR FILAMENT WOUND AIRCRAFT TIRES

BACKGROUND OF THE INVENTION

Toroidal aircraft pneumatic tires of the type shown and described in my U.S. Pat. No. 3,171,462, involve a reinforcing inner ring or band around which the fabric plies of the carcass are wrapped which ring or band, when the tire is inflated, hold the rim-engaging heel portion of the carcass in firm tire-seating engagement with the annular seating surface of a split rim having an annular seat for the inner circumference or the said heel portion of the tire with the side flanges of the rim engaging the sides of the tire carcass. The rim-engaging portion of the tire, at the outer or side edges of the rim, comprises a highly stressed region that is subject to great flexure, compression bending and fatigue during use, often causing premature or short tire life and failure long before the expected tread wear limit is reached. This unexpected or premature failure in aircraft tires is often very serious and extensive aircraft damage and destruction can take place, either in "takeoff" or in landing, especially on rough and uneven runways with heavily loaded aircraft.

SUMMARY OF THE INVENTION

A specific embodiment of the invention involves the addition of circular fabric inserts, or strips, fixed in and between the carcass piles of filament wound toroidal tires in order to control the strength and stiffness of the critical, highly stressed region of the tire at the opposite sides of the supporting rim adjacent the side edges of the rims.

These fabric inserts may be circular strips composed of either woven or unidirectional inserts of filaments, such as glass, metal wire, nylon, dacron, rayon or other material suitably treated in order that good adhesion to the rubber be obtained. The inserts may or may not be coated with an elastomeric compound similar to that utilized in the carcass of the tire. The purpose of the insertion of these strips in the tire is to control the deformation of the strip inserted area of the tire in order to eliminate the flexural and compression fatigue in the sidewall portions of the toroidal carcass reinforcement adjacent the edges of the supporting rim. The strip inserts may be oriented with respect to the orientation of the carcass cords in order to obtain various degrees of reinforcement. The outer radial edges of the circular strip inserts may be offset, or stepped off radially of the tire, in order to provide a gradual radial decrease of modulus and stiffness in the tire sidewall from the rim edge area outwardly.

BRIEF DESCRIPTION OF THE DRAWINGS

Like reference characters refer to like parts in the several figures of the drawings in which.

Figure 1:
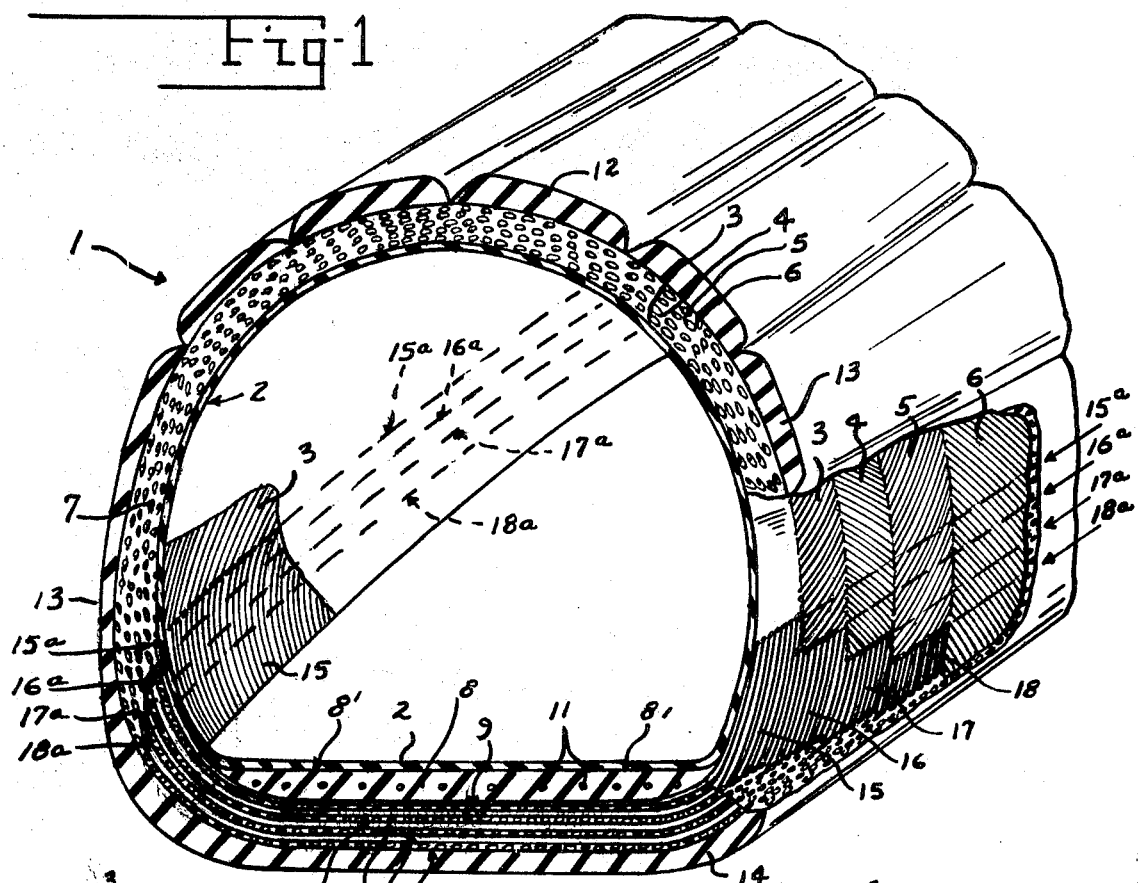
FIG. 1 is a perspective view in partial section of a toroidal tire incorporating the invention, portions being broken away to show construction details.

Referring to the drawings, the tire referred to generally is indicated at 1, and is in the form of a "toroid" having the usual air inflation valve (not shown) in the sidewall (as indicated at 14) in my U.S. Pat. No. 3,171,462.

It includes an air-sealing inner tube or liner 2 which forms an inflatable flexible "forming" mandrel on which the reinforcing plies 3, 4, 5 and 6 of the carcass 7 are wound with the radial or 90°oriented fabric strip inserts therebetween. In this disclosure, the plies 3, 4, 5, 6 of the carcass include reinforcing cords which are alternately disposed in the successive fabric layers in oppositely inclined relation to the circular axis of the tire.

Any foreign matter on the outer surface of the inner tube 2 or mandrel is removed, after which the outer surface of the tube is primed with a suitable bonding agent, such as a rubber cement.

Figure 2:
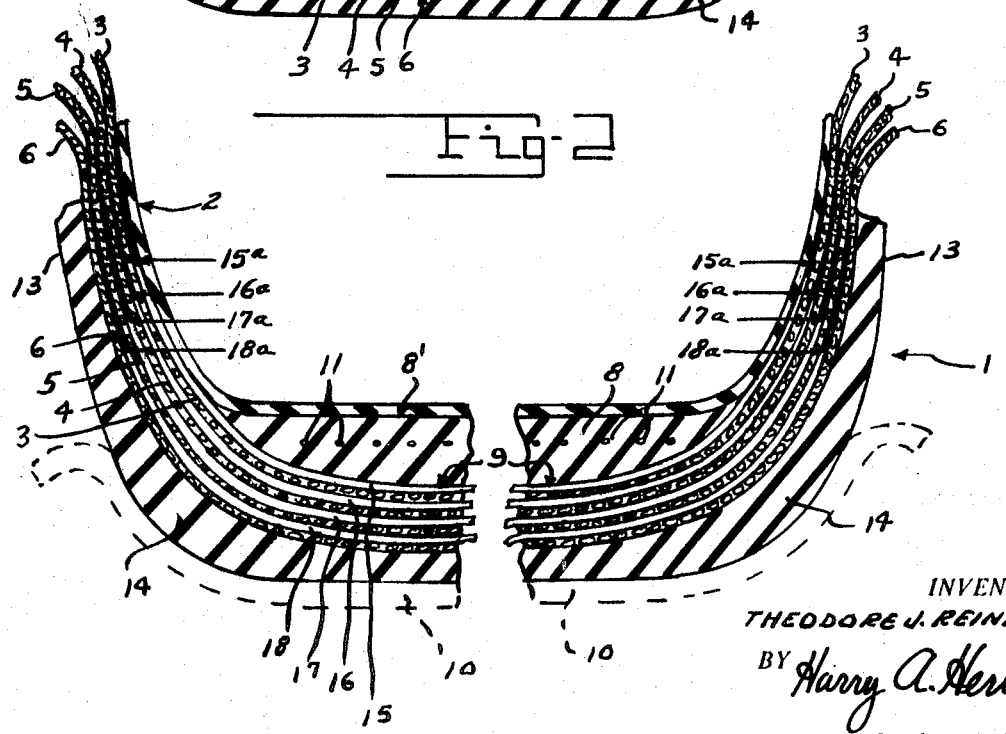
FIG. 2 is an enlarged fragmental transverse sectional view, parts being broken away and showing a portion of a split rim in dotted lines.

A performed annular reinforcing ring or band 8, of the outer surface of fiber glass, is provided having an outer substantially flat surface 8' mating the inner periphery of the outer surface of the inner tube or sealing liner or mandrel 2 and has a slightly convex outer surface 9 of the general configuration of the channel of a split wheel rim 10 on which the tire is to be mounted, such as the rim, shown dotted in FIG. 2.

The reinforcing ring, or band, 8 may be fabricated of any suitable material, and formed in a suitable manner to provide a firm base for retaining the tire 1 on the split rim 10 or the wheel on which the tire is to be mounted. The reinforcing ring or band 8 is made in a conventional manner, for instance, of fiberglass or other suitable material, and may include a plurality of reinforcing wires or cords 11 preferably insulated from each other by a cured rubberlike compound, and fabric covered.

After the reinforcing ring 8 has been properly placed on the inflated inner mandrel or tube 2, the subassembly, so formed, is placed in a commercial "winding" or wrapping machine which wraps, as shown in my U.S. Pat. No. 3,171,462, a predetermined number of successive flexible plies 3, 4, 5, 6 around the inflated tube 2 and fiberglass, reinforcing ring 8. The plies are preferably formed of bias tapes made of calendered fabric of a predetermined gauge and width which may or may not be impregnated with rubber-type insulating material. The tapes, such as indicated at 3, 4, 5 and 6, and shown in FIG. 1, are bias-corded fabric strips with the cords in the successive plies laid in oppositely inclined or angular crossing directions.

The bias-corded tapes forming the plies 3, 4, 5, and 6 are each helically and successively wrapped around the inflated inner mandrel or tube 2 and the reinforcing ring or band 8, with abutting, and preferably overlapping, edges to form the plies. For instance, providing the individual plies 3, 4, 5 and 6 as shown in the drawings, the plies of fabric tape preferably contain nylon cords secured in close parallel relation to each other and laid in the tapes on the bias.

In the drawings, the reference numeral 12 denotes the usual tire tread rubber while the exterior sidewall rubber is indicated at 13, extending down and around the heel portion 14, and may extend across the bottom of the carcass to provide the "seating" portion of the tire that is receivable in the channel of the split rim 10, between the side flanges thereof.

In order to increase the strength and modulus of the tire carcass at the normally excessive bending and stress area adjacent the heel and the outer edges of the rim 10, a plurality of additional circular fabric insert strips or bands 15, 16, 17 and 18 are provided, with one of them interposed between each pair of the respective plies 3 and 4, 4 and 5, and 5 and 6, with one strip 15 disposed between the ply 3 and the inflatable inner tube liner or mandrel 2, as clearly shown in FIG. 1.

The strips 15, 16, 17 and 18 may progressively vary in width, relative to each other, with the strip 15 being the widest so that the outer edges of the strips in the sidewall of the carcass progressively increase in radial distance from the rim area and are therefore uniformly staggered outwardly from the heel portion of the tire and rim toward the tread 12, for instance, as indicated at 15a, 16a, 17a and 18a. Also as shown, the reinforcing cords in the strips are disposed radially of the tire area, and may be glass fiber, metal, wire, nylon, dacron, rayon or other reinforcing filament material, and the fibers or cords may or may not be coated with an elastomeric tire compound similar to that used in the plies and carcass of the tire. Also the strips 15, 16, 17 and 18 may be woven, or of unidirectional fabrics.

One of these strips 15 to 18 is sandwiched between each pair of the plies 4 to 6 and the liner 2, with their upper or outer radial edges located radially outwardly at predetermined different distances in the sidewall from the heel and edge of the rim 10 to progressively increase the strength and stiffness of the tire carcass 7 adjacent the heel area, to prevent flex and compression fatigue failure of the carcass plies 3 to 6 in this highly stressed area.

For purposes of exemplification, a particular embodiment of the invention has been shown and described to the best understanding thereof. However, it will be apparent that slight changes and modification in the arrangement and construction of the parts thereof may be resorted to without departing from the true spirit and scope of the invention as defined in the accompanying claims.

I claim:

1. A toroidal wound pneumatic tire comprising, in combination, a carcass having a wide and enlarged, annular reinforcing base band; an annular inflatable, inner tube mandrel encircling the outer diameter surface of said band, said reinforcing band having an outer complemental surface in substantial contact with and secured to the inner circumference of, and thereby providing substantial reinforcement to the said inflatable, inner tube mandrel, said band further having tapered opposite side edges blending into, and thereby providing mutual support with the outer surface of said inner tube mandrel; and an inner diameter surface opposite said outer diameter surface complemental in shape and size to that of the tire-supporting surface of a rim on which the tire is to be mounted, said carcass further including principal, tire-supporting and reinforcing means comprising a plurality of fabric plies being formed into a toroidal wound configuration and thereby completely encircling said inner tube mandrel and said reinforcing band in superimposed relation, and further providing a continuous and closed, support structure throughout the tire carcass from beneath the tire tread, sidewall and heel portions; and auxiliary tire-supporting and reinforcing means comprising a plurality of arcuate reinforcing, flexible fabric insert strips respectively and alternately interposed between said plurality of fabric plies and each extending from one sidewall to the other and across the heel portion of the tire in a continuous, unbroken and mutually supporting and reinforcing relation with said fabric plies, said strips being formed with varying widths each progressively increasing a predetermined amount, and having outwardly extending and oppositely oriented, radial edges disposed in the tire sidewalls at increasing and predetermined distances from the heel area of the tire outwardly between said plies in the direction of the tire tread, beyond the opposite side edges of said reinforcing band to thereby gradually increase the strength and modulus of the tire carcass from a minimum in the sidewall area of the tire remote from its heel area to a maximum at the position thereof adjacent the edges of a rim or wheel on which the tire is mounted and where the strongest bending forces are exerted against the tire.